E. McC. STEVENSON.
Petroleum-Wells.
No. 157,648.
Patented Dec. 8, 1874.
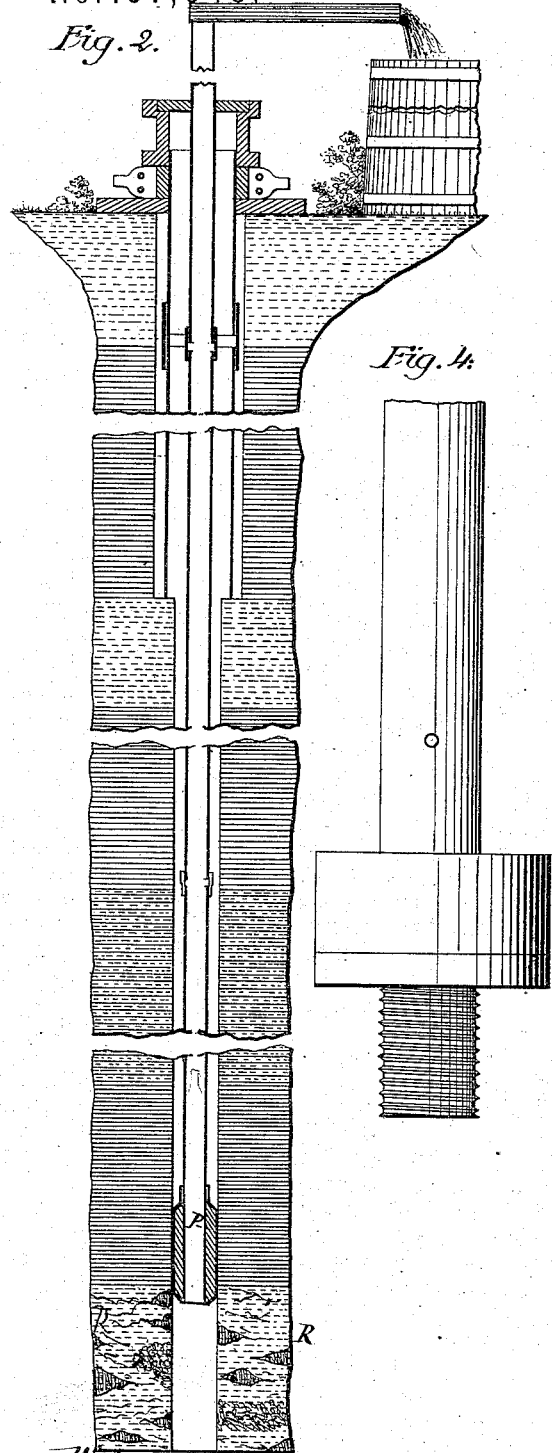
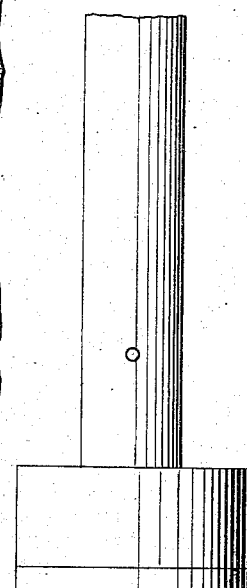
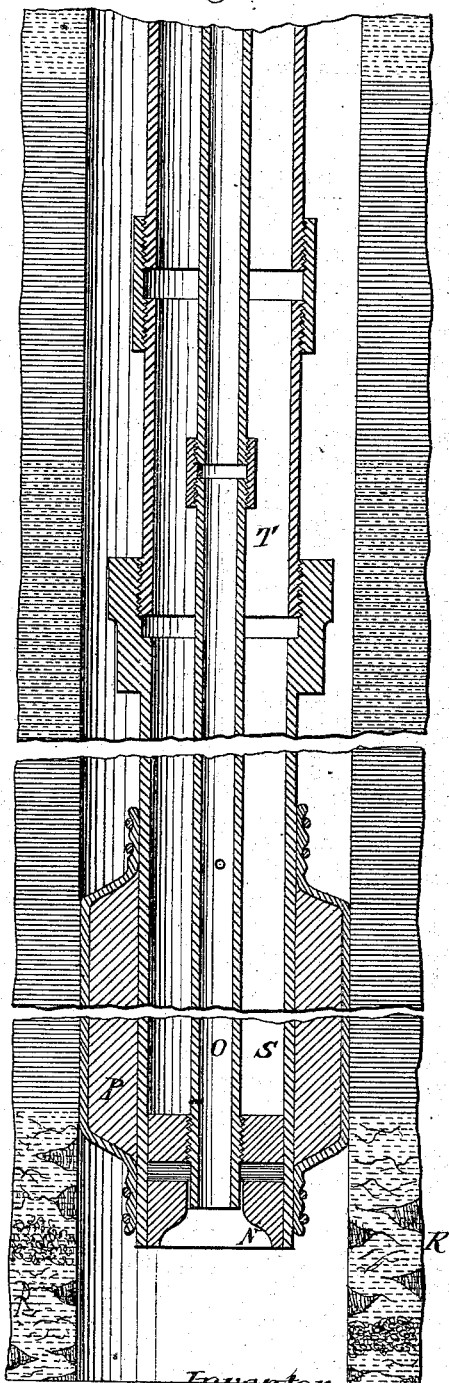

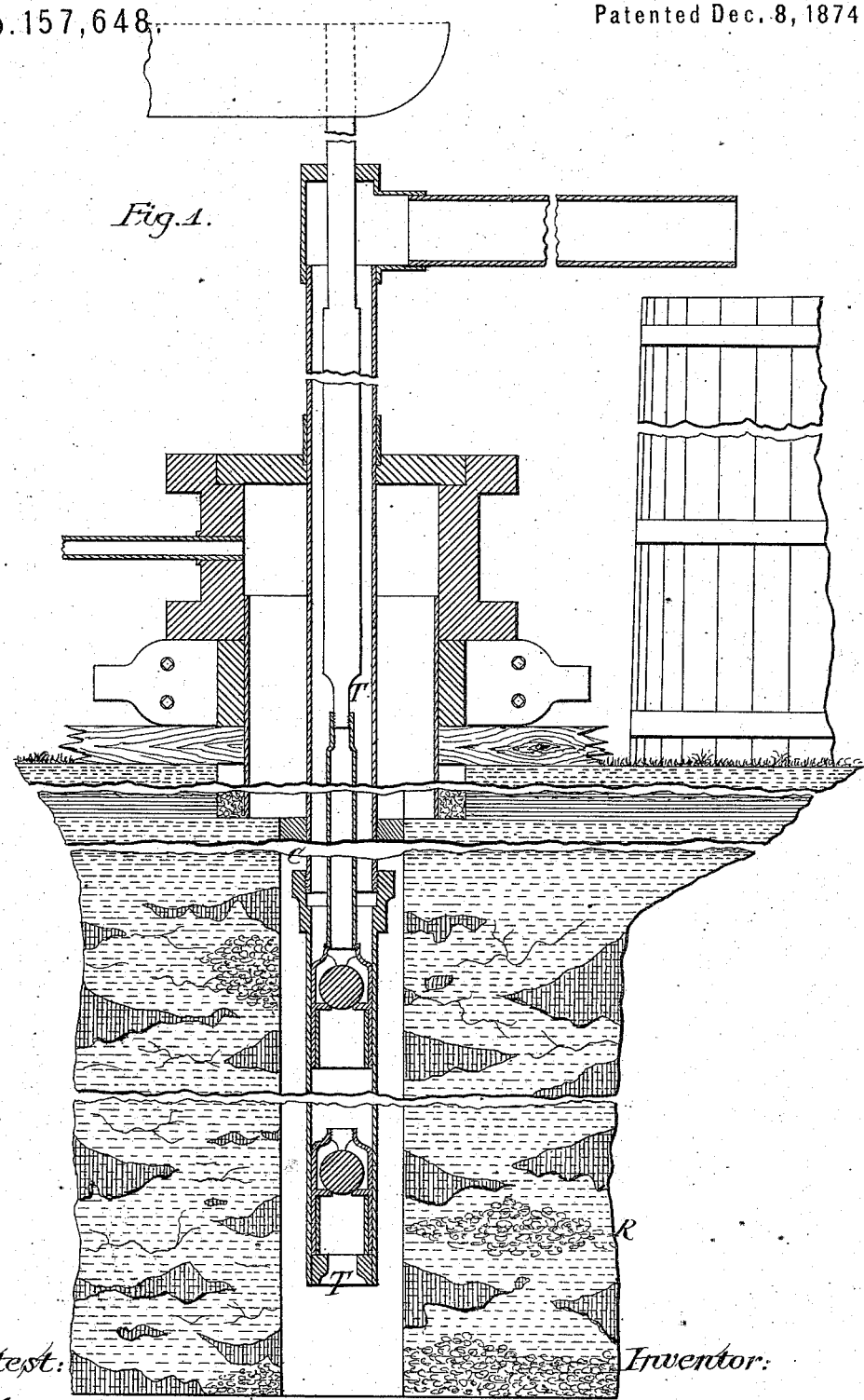

UNITED STATES PATENT OFFICE.

ELISHA McCURDY STEVENSON, OF FRANKLIN, PENNSYLVANIA.

IMPROVEMENT IN PETROLEUM-WELLS.

Specification forming part of Letters Patent No. 157,648, dated December 8, 1874; application filed September 10, 1874.

*To all whom it may concern:*

Be it known that I, ELISHA McCURDY STEVENSON, of Franklin, in the county of Venango and State of Pennsylvania, have invented certain new and useful Improvements in Petroleum-Wells; and I do hereby declare that the following is a full, clear, and exact description thereof, which will enable others skilled in the art to which it pertains to make and use the same, reference being had to the accompanying drawings, and to the letters of reference marked thereon, which form a part of this specification.

Figure 1 represents a vertical section of a well, provided with tubing and packer, under the arrangement usually employed in pumping-wells. Fig. 2 is a vertical section of a well having my improvement applied in its simplest form, and Fig. 3 represents a modification of the same.

My invention relates to a new and useful method or process of utilizing the expansive power of the gas in the oil of a petroleum-well for the purpose of making the well flow.

The oil and gas, as forced through the pores of the rock, are intimately incorporated with each other, the gas having a tendency to expand and separate itself from the oil as soon as it is released from the great compression under which they exist in the oil-bearing rock. Hence, after reaching the well such separation does take place, (under the ordinary construction employed,) the gas passing off and leaving the oil in the well, unless the rate of supply be so great that the gas cannot leave the well without carrying the oil with it.

It sometimes occurs, in wells constructed as shown in Fig. 1, that the liberated gas accumulates in the chamber below the packer (marked C) until sufficient pressure is created to eject the column of comparatively clear, solid, or dead oil in the tube T, such discharge continuing until the pressure is sufficiently reduced, then ceasing until the gas has accumulated so as to start it again.

The object of my invention is to produce a flow of oil from those wells which now require pumping, and to improve those wells which sometimes flow by other methods.

I have found that by preventing the character of this fluid from changing when it comes into the well, and while passing to the top of the well—that is, by keeping the gas and oil together, substantially as they naturally exist in the rock—the well may be made to flow even when too far exhausted to pay for pumping.

I accomplish my purpose by diminishing the size of the outlet through which the oil is discharged, and using, in combination with such reduced discharging-outlet, a packer arranged at the lower end of the discharge-tube, so that there is no chamber formed within the well above the lower end of the tube, as will be hereinafter explained.

In Fig. 2 of the drawings, R represents the oil-bearing rock, into which the well W is bored to the desired depth. T is the flowing or discharging tube, which, instead of extending to a point near the bottom of the well, stops about on a line with the surface or upper part of the oil-bearing rock. P is the packer, arranged, as shown, at the lower end of the tube T. As the oil is forced through the pores of the rock R, it fills the well below the packer with a compound of oil and gas, in a condition somewhat resembling the effervescing of soda-water when being discharged from a soda-fountain; and, as fast as it reaches the end or opening of the tube T, it enters it in the same condition, and is discharged at the top of the well, the size of the tube being so proportioned to the yield of the well that the oil and gas cannot separate, but, being substantially kept together, the rapidly-expanding gas carries the oil with increased velocity to the top of the well.

Under ordinary circumstances there is a continual discharge of gas from wells which do not flow, and by reducing the size of the tube, and placing the packer at the bottom of the tube and near the upper surface of the oil-bearing rock, I compel this flow of gas to take place through the tube, and thus discharge its contents.

As the yield becomes materially reduced, I further diminish the size of the flowing tube, either by taking out the old one, and putting a smaller one in its place, or by introducing a smaller one inside the old one with a suitable packing, as is plainly shown in Fig. 3.

It will be understood that merely reducing the size of the discharging-tube without moving the packer downward to reduce or get rid of the gas-chamber will not accomplish the desired result, because the same amount of pressure per square inch is required to lift a column of dead fluid in a small tube as in a large one. Hence, by preventing the formation of a gas-chamber, I utilize the expansive force of the gas (which is so intimately incorporated with the oil in the rock) while still in the oil, and do not require nearly so great an expenditure of force as would be required with a gas-chamber, into which the gas could escape from or out of the oil, the ascending-column consisting of a light effervescing fluid, instead of a heavy dead fluid, as would be the case with a gas-chamber.

For this reason I can actually increase the yield of a well by relieving the pressure upon its inner walls, and thus permitting a freer flow of oil through and from the rock, and thus also secure a continuous flow.

Under ordinary circumstances, with a well of, say, one thousand feet in depth, I propose to use a pipe of one-fourth to one-half inch, inside diameter, for wells yielding from one to five barrels per day; a pipe from one-half to one inch for wells yielding from five to thirty barrels per day; a pipe from one to one and a half inches in diameter for wells yielding from thirty to seventy-five barrels per day; and a pipe from one and a half to two inches in diameter for wells yielding above seventy-five barrels per day; but I do not wish to be limited to the precise measurements here given; nor do I wish to be limited to placing the packer on the lower end of the flowing-tube at the precise point relative to the upper line of the oil-bearing rock, which is indicated in the drawings, as some of the advantages of my invention may be derived without adhering closely to the arrangement here shown, although I consider this plan to be productive of the best results.

I do not in this application claim the combination of the flowing-tube O with the plate S and the seat N and the tube T, or equivalents, as shown in Fig. 3, as that forms the subject-matter of another division, filed complete December 19, 1873.

Having thus set forth the nature of my invention, and means for carrying it into effect, what I claim is—

1. The combination of a flowing-tube, which receives the oil at or near the upper surface of the oil-bearing rock, with a packer, arranged at or near the upper surface of the oil-bearing rock, to prevent the separation of the gas from the oil, whereby the gas, when passing through the flowing-tube, is caused to carry with it the oil with which it is incorporated, substantially as set forth.

2. The combination, with a packer, arranged as described, of a succession or series of flowing-tubes, decreasing in diameter in proportion to the flowing capacity or yield of the well, substantially as set forth.

In testimony that I claim the foregoing as my own I affix my signature in presence of two witnesses.

ELISHA McCURDY STEVENSON.

Witnesses:
LYMAN STEWART,
G. B. FRY.